(12) United States Patent
Rocchia et al.

(10) Patent No.: US 6,370,438 B1
(45) Date of Patent: *Apr. 9, 2002

(54) PROGRAMMABLE CONTROLLER MODULE

(75) Inventors: Gilles Rocchia, Varces;
Jean-Christophe Krieger, Montbonnot;
Eric Domont, Varces, all of (FR)

(73) Assignee: Schneider Automation, Valbonne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,926

(22) Filed: Mar. 19, 1998

(30) Foreign Application Priority Data

Mar. 19, 1997 (FR) .......................... 97 03521

(51) Int. Cl.[7] ................................. G05B 9/02
(52) U.S. Cl. ........................ 700/79; 700/21; 700/22; 700/292
(58) Field of Search ............... 700/79, 21, 22, 700/292; 361/31, 33, 170

(56) References Cited

U.S. PATENT DOCUMENTS

| | | | |
|---|---|---|---|
| 4,117,317 A | * 9/1978 | Dooley, Jr. et al. | 714/820 |
| 4,192,489 A | * 3/1980 | Babich et al. | 266/88 |
| 4,380,796 A | * 4/1983 | Ostby | 364/188 |
| 4,436,185 A | * 3/1984 | Ludwig et al. | 187/247 |
| 4,512,442 A | * 4/1985 | Moore et al. | 187/393 |
| 4,774,656 A | * 9/1988 | Quatse et al. | 714/4 |
| 4,974,179 A | * 11/1990 | Patton et al. | 341/51 |
| 5,225,813 A | * 7/1993 | Raub, Sr. | 340/623 |
| 5,258,868 A | * 11/1993 | Jensen et al. | 359/168 |
| 5,396,574 A | * 3/1995 | Base et al. | 392/489 |
| 5,549,469 A | * 8/1996 | Wild et al. | 431/75 |
| 5,686,913 A | * 11/1997 | Coln et al. | 341/51 |
| 5,841,257 A | * 11/1998 | Hashimoto et al. | 318/568.11 |
| 6,018,179 A | * 8/2000 | Katae et al. | 361/31 |

FOREIGN PATENT DOCUMENTS

EP        0 276 937        8/1988

* cited by examiner

Primary Examiner—Ario Etienne
Assistant Examiner—Firmin Backer
(74) Attorney, Agent, or Firm—Oblon, Spivak, McClelland, Maier & Neustadt, P.C.

(57) ABSTRACT

The present invention relates to a programmable controller module that communicates in series or parallel with the central processing unit, characterized by the fact that it comprises a safety unit (2) composed of hardwired components that receive the plus charge of a DC power supply via a series of contacts (S4 to S7) and the zero volt charge via a series of contacts (S0 to S3), and control safety relays (K1 and K2) connected to outputs (A3, O1, O2) to which are connected electrical apparatuses (K3, K4) disposed on the power lines, and means (L0–7) for reading the status of the various contacts and the status of the outputs associated with the relays.

20 Claims, 2 Drawing Sheets

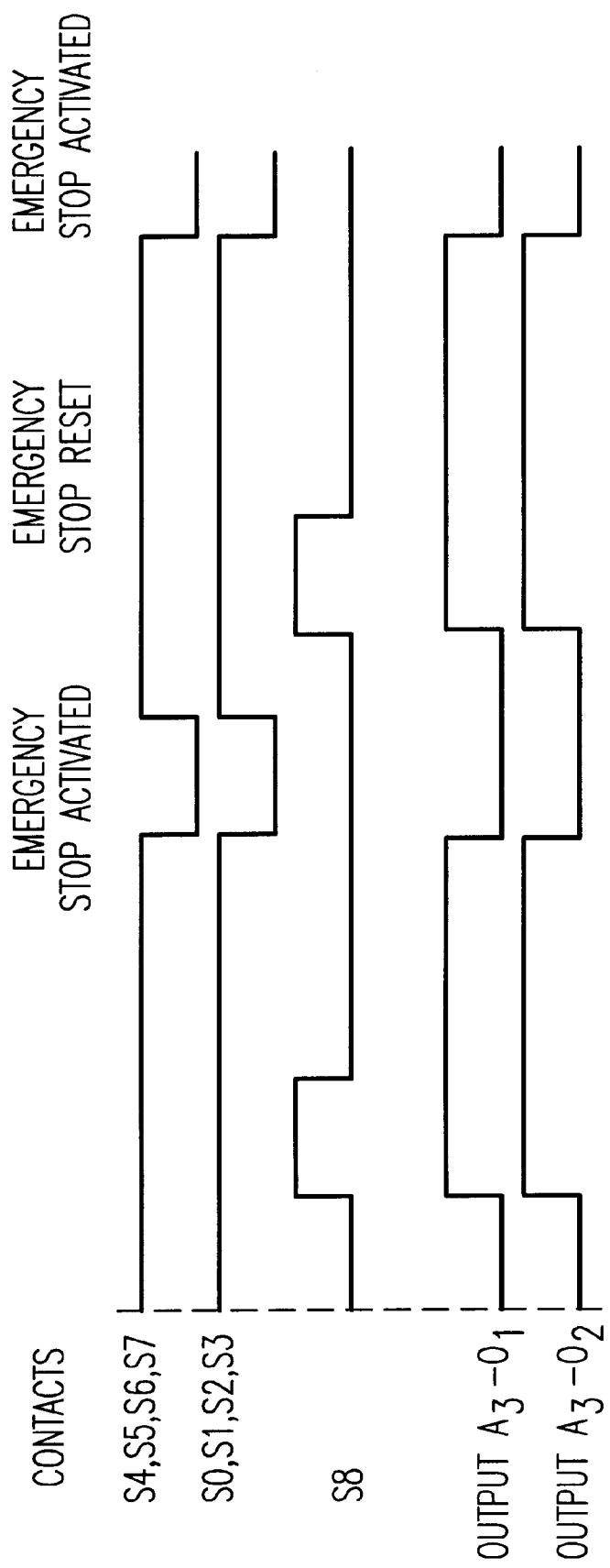

PROGRAMMABLE CONTROLLER MODULE

BACKGROUND OF THE INVENTION

1. Field of the Invention

The present invention relates to an emergency shutdown monitoring module that communicates in series or parallel with the central processing unit of a programmable controller.

2. Discussion of the Background

Production shops and the technical installations of premises are subject to increasingly strict safety requirements.

In order to activate a switch controlling the power supply of a machine by means of a protection apparatus (emergency shutdown), a safety module is used that will ensure a reliable relay and eliminate the risks of faults in the control circuit (inputs), the power circuit (outputs) or in internal components of the safety module.

When this type of safety module is used with a programmable logic controller, the safety module remains independent of the programmable controller.

SUMMARY OF THE INVENTION

The present invention aims to provide a monitoring module for programmable controllers equipped with a hardwired logic safety function. The status of the external sensors are part of the safety function and the output commands of the hardwired safety function are read by the central processing unit of the programmable controller. The module can perform its safety functions despite the presence of faults in the input/output read system or malfunction of the programmable controller, including loss of power.

The module of the invention is characterized by the fact that it comprises a safety unit composed of hardwired components that receive the plus charge of a DC power supply via a series of contacts and the zero volt charge via a series of contacts. These components also control safety relays connected to outputs to which are connected electrical apparatuses disposed on the power lines and means for reading the status of the various contacts and the status of the outputs associated with the relays.

According to one characteristic, the module comprises read units composed of discrete components that are wired in parallel to the input contacts and designed for programmable controller diagnostics.

According to another characteristic, the module comprises a read unit that reads the command status of the safety relays.

BRIEF DESCRIPTION OF THE DRAWINGS

The invention will now be described in more detail. The description is of a non-limitative example and refers to the attached figures where:

FIG. 2 is a functional chart showing the operation of the module.

DETAILED DESCRIPTION OF THE PREFERRED EMBODIMENTS

Figure 1:
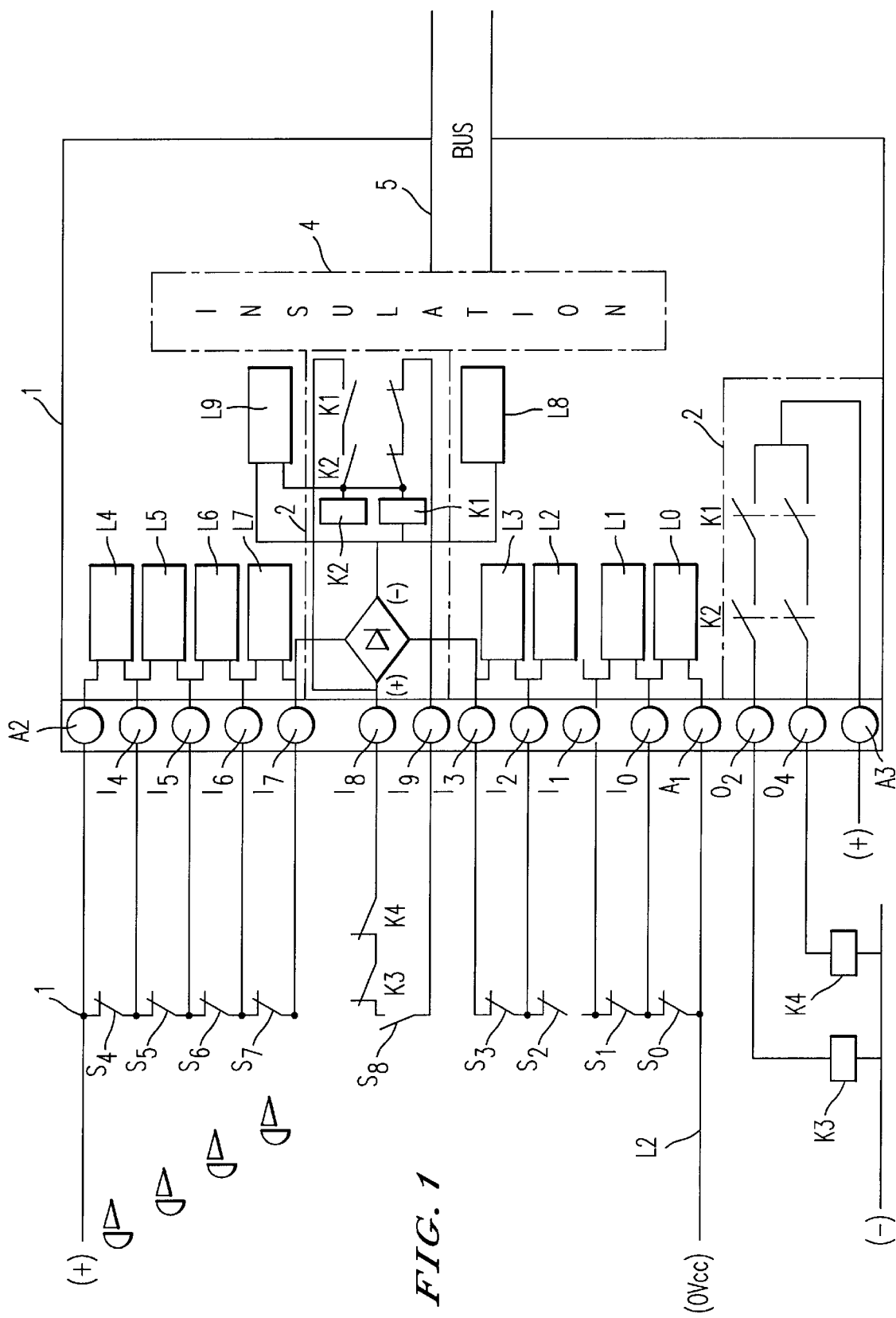
FIG. 1 is a drawing of the module according to the invention.

The module, given the overall number 1, is mounted in a compartment of a programmable controller and comprises an external power supply, a hardwired safety unit 2, read units L0 to L9 composed of discrete components and designed for programmable controller diagnostics, and a galvanic insulation unit 4 that interfaces with the programmable controller bus.

An external power supply line L1–L2 is connected via terminals A1 and A2 to read units L0 to L9 and via contact inputs and terminals I7 and I3 to safety unit 2.

The plus charge of the DC power supply is applied to a terminal I7 via the series of emergency stop buttons S4 to S7. The 0 V supply is applied to a terminal I3 via a series of 0 open contacts or position switches S0 to S3.

Read units L0 to L7 are connected to terminals 10 to 17 so that they are wired in parallel to input contacts S0 to S7. These read units perform an independent read operation on each contact. The wiring of the read units is dependent on the number and type of inputs (i.e. single or double contact) on which the diagnosis is to be performed.

Terminals I3 and I7 are connected to safety unit 2 that includes safety relays K1 and K2. The contacts of these relays control the opening and closing of the circuits between safety terminals A3 and O1 and between safety terminals A3 and O2. Safety terminals A3, O1 and O2 carry no potential.

A read unit L9 reads the command status of relays K1 and K2.

A read unit L8 reads the status of the validation input.

Safety unit 2 receives the signal from a validation input S8 that is connected in series with the contacts of switches K3 and K4 so that when this input is validated safety relays K1 and K2 are activated.

Interface unit 4 interfaces between read units L0 to L9 and the programmable controller bus and also ensures galvanic insulation.

In order that the safety function comes into play irrespective of the nature of the first failure, emergency push-buttons or dual-contact position switches must be fitted on the inputs.

Operation of the module will now be described.

Once emergency stop buttons S4 to S7 have been reset or position switches S0 to S3 have been closed, a pulse on validation input S8 energizes safety relays K2 and K2, causing closure of the two safety output 35 circuits A3-O1 and A3-O2. Contacts K1 and K2 of the safety outputs (terminals A3-O1 and A3-O2) are then closed.

The module reads the status of the push-buttons or position switches of the emergency stop series, the return loop and the control of the output circuits. These data are transmitted to the central processing unit of the programmable controller as input bits.

Pressing one of emergency stop buttons S4 to S7 or loss of external power supply immediately causes K1 and K2 to open, causing opening of the safety circuits. Opening of contacts S0 to S3 also triggers the opening of these two safety circuits.

It is clear that a wide variety of variants and minor improvements could be made to the module, even using equivalent means, without going beyond the actual scope of the invention.

What is claimed is:

1. A monitoring module for communicating with a central processing unit of a programmable controller, comprising:
   a first series of contacts comprising emergency stop buttons;
   a second series of contacts comprising one of: open contacts and position switches;

a hardwired safety unit configured to receive a charge of a DC power supply via the first series of contacts, to receive a zero volt charge via the second series of contacts, and to control safety relays connected to outputs, the outputs being connected to electrical apparatuses disposed on a power line; and read units wired in parallel to the first series of contacts and second series of contacts, configured to perform an independent read operation on each of the first series of contacts and each of the second series of contacts to read statuses of the first series of contacts and second series of contacts and configured to read statuses of the safety relays from the outputs connected to the safety relays, and designed for programmable controller diagnostics.

2. The module of claim 1 wherein the read units each comprise discrete components.

3. The module of claim 1 or 2 wherein the statuses of the safety relays include a command status, and wherein at least one of the read units is configured to read the command status of the safety relays.

4. The module of claim 1, further comprising a galvanic insulation unit configured to interface with a programmable controller bus.

5. The module of claim 1, further comprising power supply terminals for the read units.

6. The module of claim 1, wherein the safety unit is connected to a validation input.

7. The module of claim 6, wherein at least one of the read units is configured to read the validation input.

8. The module of claim 2, further comprising a galvanic insulation unit configured to interface with a programmable controller bus.

9. The module of claim 3, further comprising a galvanic insulation unit configured to interface with a programmable controller bus.

10. The module of claim 2, further comprising power supply terminals for the read units.

11. The module of claim 3, further comprising power supply terminals for the read units.

12. The module of claim 4, further comprising power supply terminals for the read units.

13. The module of claim 2, wherein the safety unit is connected to a validation input.

14. The module of claim 3, wherein the safety unit is connected to a validation input.

15. The module of claim 4, wherein the safety unit is connected to a validation input.

16. The module of claim 5, wherein the safety unit is connected to a validation input.

17. The module of claim 13, wherein at least one of the read units is configured to read the validation input.

18. The module of claim 14, wherein at least one of the read units is configured to read the validation input.

19. The module of claim 15, wherein at least one of the read units is configured to read the validation input.

20. The module of claim 16, wherein at least one of the read units is configured to read the validation input.

* * * * *